US011467301B1

United States Patent
Li et al.

(10) Patent No.: US 11,467,301 B1
(45) Date of Patent: Oct. 11, 2022

(54) METHOD AND SYSTEM FOR IDENTIFYING PORE AND FRACTURE BASED ON TWO-DIMENSIONAL (2D) SCAN IMAGE OF CORE

(71) Applicant: INSTITUTE OF GEOLOGY AND GEOPHYSICS, CHINESE ACADEMY OF SCIENCES, Beijing (CN)

(72) Inventors: Guoliang Li, Beijing (CN); Jijin Yang, Beijing (CN); Jianguo Wu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/830,343

(22) Filed: Jun. 2, 2022

(30) Foreign Application Priority Data

Feb. 22, 2022 (CN) .......................... 202210159608.3

(51) Int. Cl.
*G01V 1/30* (2006.01)
*G06T 7/11* (2017.01)
(52) U.S. Cl.
CPC .................. *G01V 1/30* (2013.01); *G06T 7/11* (2017.01); *G01V 2210/646* (2013.01)
(58) Field of Classification Search
CPC .............................. G06T 7/11; G01V 2210/646
See application file for complete search history.

(56) References Cited

U.S. PATENT DOCUMENTS

2013/0236064 A1  9/2013  Li et al.

FOREIGN PATENT DOCUMENTS

| CN | 102867302 A | 1/2013 |
| CN | 107133630 A | 9/2017 |
| CN | 107993261 A | 5/2018 |
| CN | 110853138 A | 2/2020 |

OTHER PUBLICATIONS

Tong et al., Quantitative Analysis of Nanopore Structural Characteristics of Lower Paleozoic Shale, Chongqing (Southwestern China): Combining FIB-SEM and NMR Cryoporometry, 2017, Energy & Fuel 31, pp. 13317-13328 (Year: 2017).*

* cited by examiner

*Primary Examiner* — Toan M Le
(74) *Attorney, Agent, or Firm* — Bayramoglu Law Offices LLC

(57) ABSTRACT

A method for identifying a pore and a fracture based on a two-dimensional (2D) scan image of a core includes: scanning a core to acquire an initial 2D image of the core; filtering the initial 2D image of the core to acquire a first 2D image of the core; segmenting the first 2D image of the core to acquire a second 2D image of the core; extracting center coordinates of all pixel points in each void space to acquire a centroid of the void space, and establishing a pore-fracture identification function of the void space; identifying the void space as a fracture if a value of the pore-fracture identification function is greater than a preset characterization value; and identifying the void space as a pore if the value of the pore-fracture identification function is not greater than the preset characterization value.

19 Claims, 6 Drawing Sheets

METHOD AND SYSTEM FOR IDENTIFYING PORE AND FRACTURE BASED ON TWO-DIMENSIONAL (2D) SCAN IMAGE OF CORE

CROSS REFERENCE TO THE RELATED APPLICATIONS

This application is based upon and claims priority to Chinese Patent Application No. 202210159608.3, filed on Feb. 22, 2022, the entire contents of which are incorporated herein by reference.

TECHNICAL FIELD

The present disclosure belongs to the technical field of geological exploration of oil and gas reservoirs, and in particular relates to a method and system for identifying a pore and a fracture based on a two-dimensional (2D) scan image of a core.

BACKGROUND

The void space in the reservoir rock refers to the space not filled by mineral particles, cements or other solid matter, and includes pores and fractures. Pores refer to the inter- and intra-granular filling voids in the rock, and fractures refer to cracks formed during rock diagenesis or under the action of various tectonic stresses.

The pore and fracture characteristics (size, geometry, distribution and interconnection) of the microscopic void space of the reservoir rock directly reflect the seepage capability of the reservoir, providing an important basis for reservoir evaluation. The pore and fracture characteristics of the reservoir rock are very important for oil and gas exploration and development. They are directly related to the oil and gas storage capacity, the migration mechanism and capacity and the sedimentary evolution process of the reservoir rock, as well as the occurrence states of oil and gas, and eventually affect the difficulty of oil and gas production and the value of exploration and development. Therefore, it is of great significance to accurately distinguish the pore and fracture characteristics of the reservoir rock. To accurately reflect the seepage capability of the reservoir rock and formulate an accurate exploration and development plan, it is necessary to accurately understand the pore and fracture characteristics of the reservoir rock.

SUMMARY

In order to solve the problem that the prior art cannot accurately and efficiently distinguish pores or fractures and cannot quantitatively analyze the pore or fracture characteristics, the present disclosure provides a method and system for identifying a pore and a fracture based on a two-dimensional (2D) scan image of a core.

A first aspect of the present disclosure provides a method for identifying a pore and a fracture based on a 2D scan image of a core. The method includes the following steps:

S100: scanning a core to acquire an initial 2D image of the core;

S200: filtering the initial 2D image of the core to acquire a first 2D image of the core;

S300: segmenting the first 2D image of the core to acquire a second 2D image of the core;

S400: extracting, based on the second 2D image of the core, center coordinates of all pixel points in each void space to acquire a centroid of the void space, and establishing a pore-fracture identification function of the void space; identifying the void space as a fracture if a value of the pore-fracture identification function is greater than a preset characterization value; and identifying the void space as a pore if the value of the pore-fracture identification function is not greater than the preset characterization value; and S500: traversing, by repeating step S400, all void spaces to acquire pore and fracture distribution data of the second 2D image of the core.

In some preferred embodiments, a pore-fracture identification function of an n-th void space is $A_n$;

the preset characterization value refers to a value of a pore-fracture identification function of a rectangle with a set aspect ratio and a circle with a same area as the rectangle;

$$A_n = \frac{f_n}{f_{nc}};$$

$$f_n = \sum_1^i R_{ni}^a;$$

$$R_{ni} = \sqrt{(X_{ni} - X_{nc})^2 + (Y_{ni} - Y_{nc})^2};$$

$$X_{nc} = \frac{\sum_1^i X_{ni}}{i};$$

$$Y_{nc} = \frac{\sum_1^i Y_{ni}}{i};$$

where, $f_{nc}$ denotes a pore-fracture characteristic value of a circle with a same area as the n-th void space; and $X_{ni}$ denotes an abscissa of an i-th pixel point in the n-th void space, and $Y_{ni}$ denotes an ordinate of the i-th pixel point in the n-th void space.

In some preferred embodiments, S300 may specifically include: S310: extracting a void space of the core by image threshold segmentation, and acquiring a void space image of the core; and S320: removing, based on a preset single-pixel threshold, an abnormal point from the void space image of the core to acquire a second 2D image of the core.

In some preferred embodiments, the initial 2D image of the core may be acquired by a core scanning device.

In some preferred embodiments, the core scanning device may be a micron-level field emission scanning electron microscope (FE-SEM).

In some preferred embodiments, in step S200, the filtering may be mean filtering, non-local means (NLM) filtering, median filtering, Wiener filtering or Gaussian filtering.

In some preferred embodiments, in step S200, the filtering may specifically include: filtering a grayscale image with noise.

A second aspect of the present disclosure discloses a system for identifying a pore and a fracture based on a 2D scan image of a core, based on the method for identifying a pore and a fracture based on a 2D scan image of a core. The system includes an initial image acquisition module, a filtering module, an image segmentation module and a pore-fracture identification module, where the initial image acquisition module is configured to scan a core to acquire an initial 2D image of the core;

the filtering module is configured to filter the initial 2D image of the core to acquire a first 2D image of the core;

the image segmentation module is configured to segment the first 2D image of the core to acquire a second 2D image of the core; and the pore-fracture identification module is configured to extract, based on the second 2D image of the core, center coordinates of all pixel points in each void space to acquire a centroid of the void space, and establish a pore-fracture identification function of the void space; identify the void space as a fracture if a value of the pore-fracture identification function is greater than a preset characterization value; and identify the void space as a pore if the value of the pore-fracture identification function is not greater than the preset characterization value.

In some preferred embodiments, the system may further include a master control center; the initial image acquisition module, the filtering module, the image segmentation module and the pore-fracture identification module may be signally connected to the master control center; the pore-fracture identification module may be controlled by the master control center to traverse all void spaces, acquire pore and fracture distribution data of the second 2D image, and store the acquired pore and fracture distribution data in the master control center; and the master control center may formulate construction and mining strategies based on the acquired pore and fracture distribution data.

A third aspect of the present disclosure provides an electronic device, including: at least one processor and a memory communicatively connected to the at least one processor, where the memory stores an instruction executable by the processor, and the instruction is executed by the processor to implement the above method for identifying a pore and a fracture based on a 2D scan image of a core.

The present disclosure has the following beneficial effects. In existing studies, pores and fractures are mainly distinguished according to the ratio of a major axis to a minor axis. This method is only suitable for regular patterns, and cannot identify pores and fractures with special shapes. The present disclosure establishes a function with a distance from the point in the void space in the image to the centroid of the image as an independent variable, and compares the value of the function with that of the function of a circle of the same area to distinguish pores and fractures. The present disclosure can accurately and efficiently segment pores and fractures, and can quantitatively analyze the pore and fracture characteristics. Therefore, the present disclosure can better evaluate the oil and gas storage capacity and the migration capacity of the reservoir, as well as the occurrence states of oil and gas in the void space.

BRIEF DESCRIPTION OF THE DRAWINGS

Other features, objectives and advantages of the present application will become more apparent upon reading the detailed description of the non-restrictive embodiments with reference to the following drawings.

DETAILED DESCRIPTION OF THE EMBODIMENTS

The preferred implementations of the present disclosure are described below with reference to the drawings. Those skilled in the art should understand that the implementations herein are merely intended to explain the technical principles of the present disclosure, rather than to limit the protection scope of the present disclosure.

A first aspect of the present disclosure provides a method for identifying a pore and a fracture based on a 2D scan image of a core. The method includes the following steps: S100: scanning a core to acquire an initial 2D image of the core; S200: filter the initial 2D image of the core to acquire a first 2D image of the core; S300: segment the first 2D image of the core to acquire a second 2D image of the core; S400: extract, based on the second 2D image of the core, center coordinates of all pixel points in each void space to acquire a centroid of the void space, and establish a pore-fracture identification function of the void space; identify the void space as a fracture if a value of the pore-fracture identification function is greater than a preset characterization value; and identify the void space as a pore if the value of the pore-fracture identification function is not greater than the preset characterization value; and S500: traverse, by repeating step S400, all void spaces to acquire pore and fracture distribution data of the second 2D image of the core.

The present disclosure is further described below with reference to the drawings and embodiments.

Figure 1:
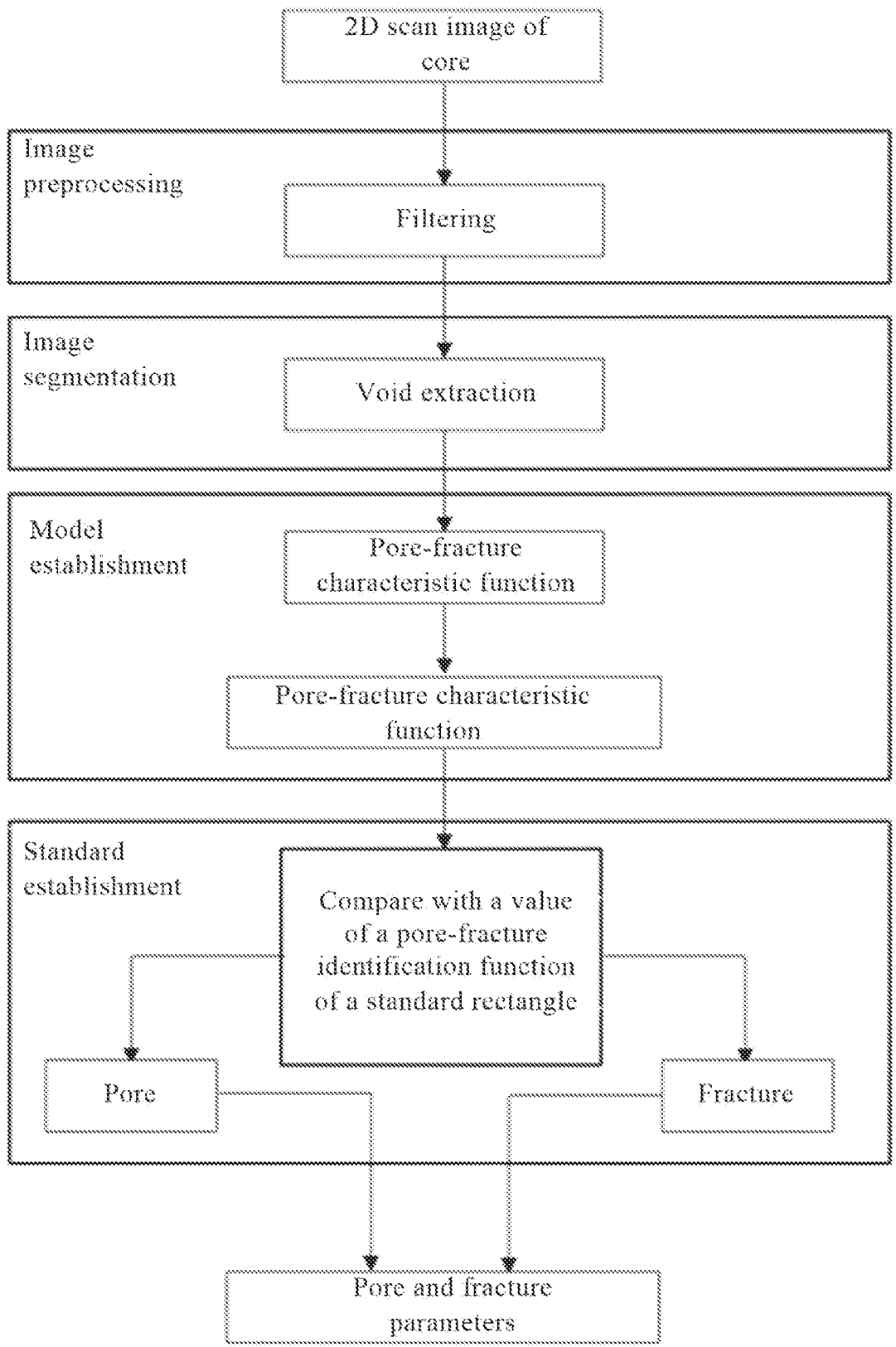
FIG. 1 is a flowchart of a method for identifying a pore and a fracture based on a two-dimensional (2D) scan image of a core according to a specific embodiment of the present disclosure.
Figure 2:
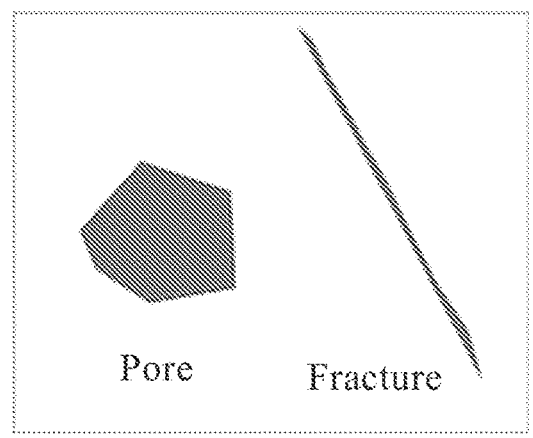
FIG. 2 shows a pore and a fracture.

Pores and fractures vary greatly in geometry. Pores are large inter- and intra-granular spaces, with little difference in axial and tangential extension. Fractures are narrow cracks that extend very differently in the axial and tangential directions. Due to the significant difference of pores and fractures in geometry (FIG. 2), pores and fractures have different oil and gas storage capacities, oil and gas occurrence states, migration mechanisms and capacities. Therefore, separate analysis of pores and fractures is required.

Specifically, referring to FIGS. 1 to 8, a first aspect of the present disclosure provides a method for identifying a pore and a fracture based on a 2D scan image of a core. The method includes the following steps. S100: Scan a core by a core scanning device to acquire an initial 2D image of the core.

Figure 3:
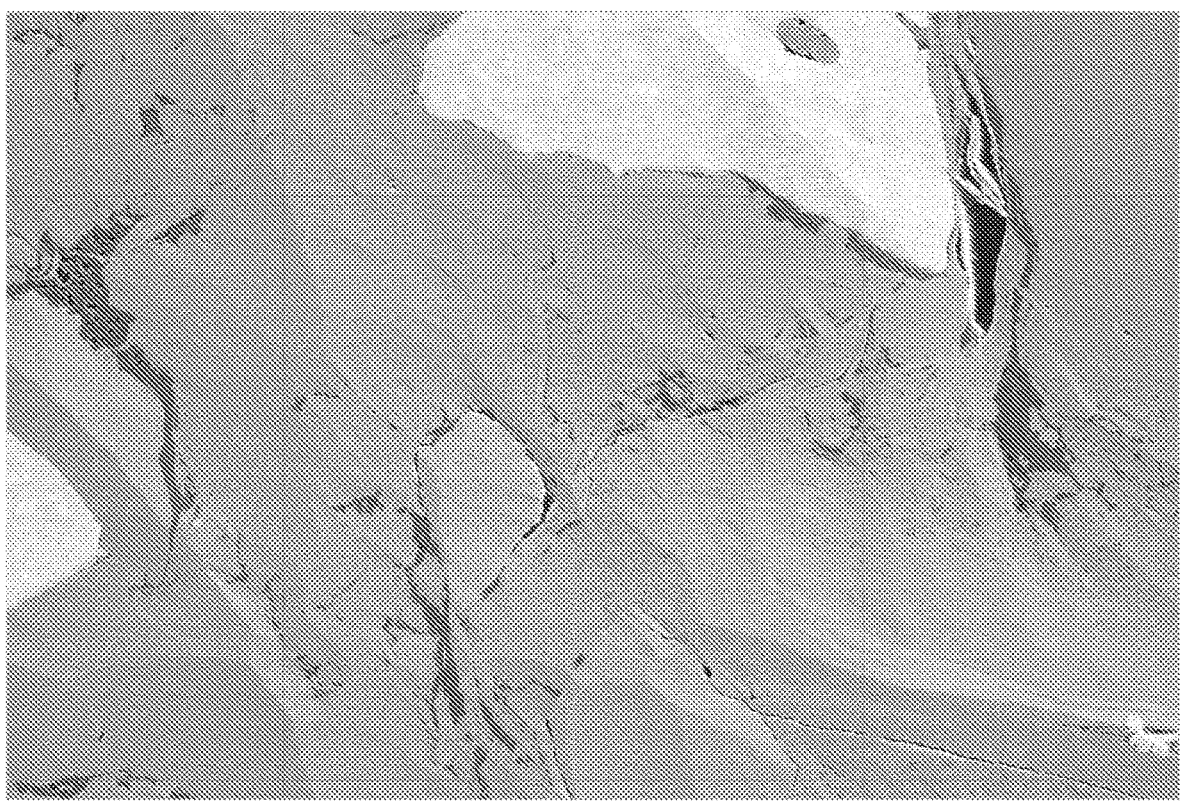
FIG. 3 shows an initial 2D image of the core according to a specific embodiment of the present disclosure.
Figure 4:
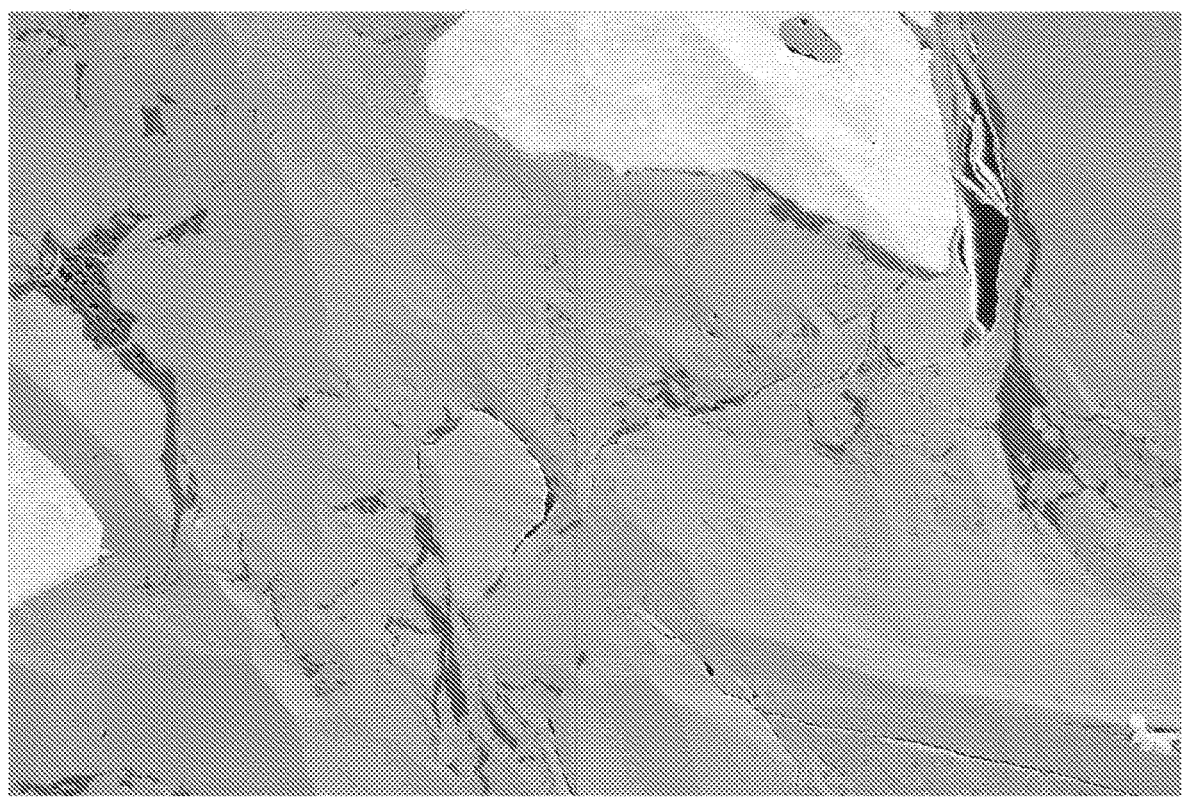
FIG. 4 shows a filtered effect of a first 2D image of the core according to the present disclosure.

In this embodiment, the core scanning device is a micron-level field emission scanning electron microscope (FE-SEM). The image size is 4,225*2,845 and each pixel represents 4 nm. That is, the scanned region is 16.9 um long and 11.38 um wide. FIG. 3 is a scan image of shale acquired by the FE-SEM in this embodiment.

It should be noted that, in addition to the scan image of the FE-SEM, the data image used may also be other 2D images, and the image size and pixel size are not limited.

S200: Filter the initial 2D image of the core to acquire a first 2D image of the core.

In some preferred embodiments, in step S200, the filtering is mean filtering, non-local means NLM) filtering, median filtering, Wiener filtering or Gaussian filtering.

In this embodiment, the image is smoothed by NLM filtering. Specifically, referring to FIG. 4, which is a filtered image of sandstone according to an embodiment of the present disclosure, the method can well preserve the detailed features of the image while removing image noise.

In some preferred embodiments, in step S200, the filtering specifically includes: filtering a grayscale image with noise.

S300: Segment the first 2D image of the core to acquire a second 2D image of the core.

Further, S300 specifically includes: S310: extract a void space of the core by image threshold segmentation, and acquire a void space image of the core; and S320: remove, based on a preset single-pixel threshold, an abnormal point from the void space image of the core to acquire a second 2D image of the core.

Figure 5:
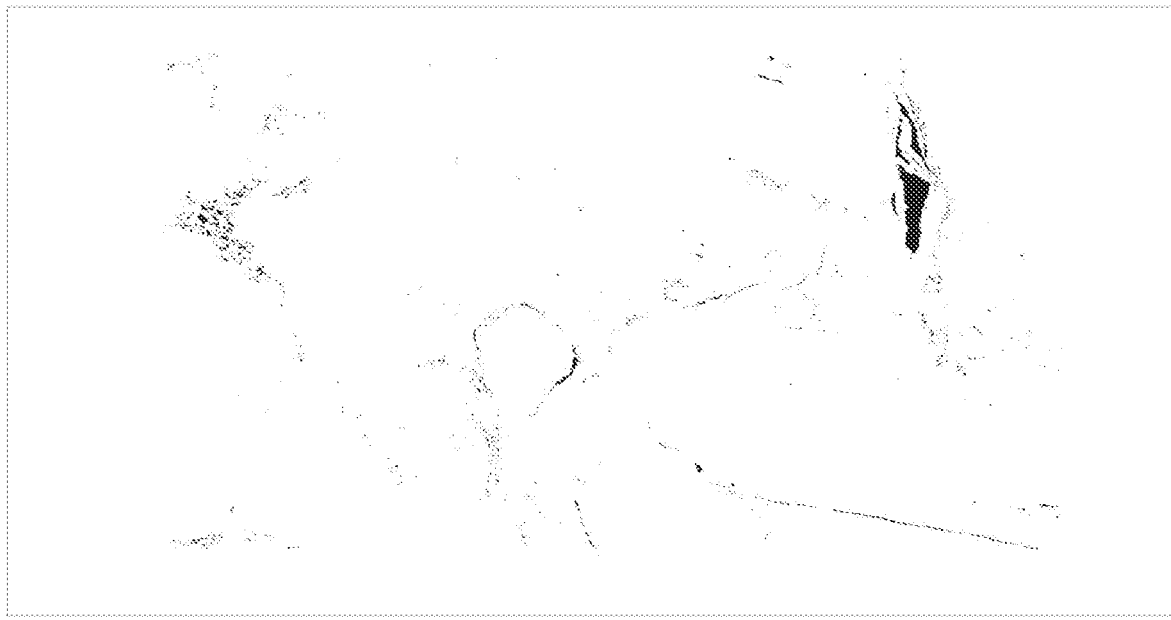
FIG. 5 is a 2D void space image extracted according to a specific embodiment of the present disclosure.

In this embodiment, referring to FIG. 5, a distribution map of voids and minerals is acquired through threshold segmentation, and a 1-pixel void and mineral at an abnormal point are removed.

S400: Extract, based on the second 2D image of the core, center coordinates of all pixel points in each void space to acquire a centroid of the void space, and establish a pore-fracture identification function of the void space; identify the void space as a fracture if a value of the pore-fracture identification function is greater than a preset characterization value; and identify the void space as a pore if the value of the pore-fracture identification function is not greater than the preset characterization value.

A pore-fracture identification function of an n-th void space is $A_n$.

The preset characterization value a refers to a value of a pore-fracture identification function of a rectangle with a set aspect ratio and a circle with a same area as the rectangle.

$$A_n = \frac{f_n}{f_{nc}}.$$

$$f_n = \sum_1^i R_{ni}^a.$$

$$R_{ni} = \sqrt{(X_{ni} - X_{nc})^2 + (Y_{ni} - Y_{nc})^2}.$$

$$X_{nc} = \frac{\sum_1^i X_{ni}}{i}.$$

$$Y_{nc} = \frac{\sum_1^i Y_{ni}}{i},$$

where, $f_{nc}$ denotes a pore-fracture characteristic value of a circle with a same area as the n-th void space; and $X_{ni}$ denotes an abscissa of an i-th pixel point in the n-th void space, and $Y_{ni}$ denotes an ordinate of the i-th pixel point in the n-th void space. $X_{nc}$ is an abscissa of a centroid of the n-th void space, and $Y_{nc}$ denotes an ordinate of a centroid of the n-th void space.

In this embodiment, the coordinates of the centroid (i.e. geometric center) of each void space are firstly extracted, which are only related to the geometric shape and size.

Specifically, for example, the centroid of a first void space is extracted. The center coordinates of each pixel point in the void space are extracted. Assuming that the void space includes i pixel points, then the center coordinates of all pixel points in this void space are expressed as $(X_{11}, Y_{11})$, $(X_{12}, Y_{12})$, ..., $(X_{1i}, Y_{1i})$, and the centroid coordinates of the first void space are $(X_{1c}, Y_{1c})$, where $$x_{1c} = \frac{\sum_1^i X_{1i}}{i}, Y_{1c} = \frac{\sum_1^i Y_{1i}}{i}.$$

The distance $R_{1i}$ from each pixel point in the first void space to the centroid is calculated: $R_{1i} = \sqrt{(X_{1i} - X_{1c})^2 + (Y_{1i} - Y_{1c})^2}$.

The pore-fracture characteristic function $f_1$ of the first void space is calculated: $f_1 = \Sigma_1^i R_{1i}^a$, where a can be any real number. In an embodiment, a is 2.

Based on the preset pore-fracture characteristic value $f_{1c}$ of a circle with the same area as the first void space, the pore-fracture identification function of the first void space is established as $A_1$:

$$A_1 = \frac{f_1}{f_{1c}}.$$

In this embodiment, the preset characterization value a is 5.29, which represents a value of the pore-fracture identification function of a rectangle with an aspect ratio of 10 and a circle with the same area as the rectangle.

If $A_1 > b$, the first void space is determined as a fracture; and if $A_1 \leq b$, the first void space is determined as a pore.

S500: Traverse, by repeating S400, all void spaces (n void spaces) to acquire a value $A_2$ of the pore-fracture identification function of a second void space and a value $A_3$ of the pore-fracture identification function of a third void space, etc., so as to acquire pore and fracture distribution data of the second 2D image of the core, thereby achieving accurate identification of all the pores and fractures in the image.

Figure 6:
FIG. 6 is a 2D pore image extracted according to a specific embodiment of the present disclosure.

Specifically, referring to FIG. 6, in this embodiment, there are 2,112 void spaces in total, including 2,076 pores identified. In this figure, pores are marked black, and the largest pore includes 36,959 pixels while the smallest pore includes 2 pixels.

Figure 7:
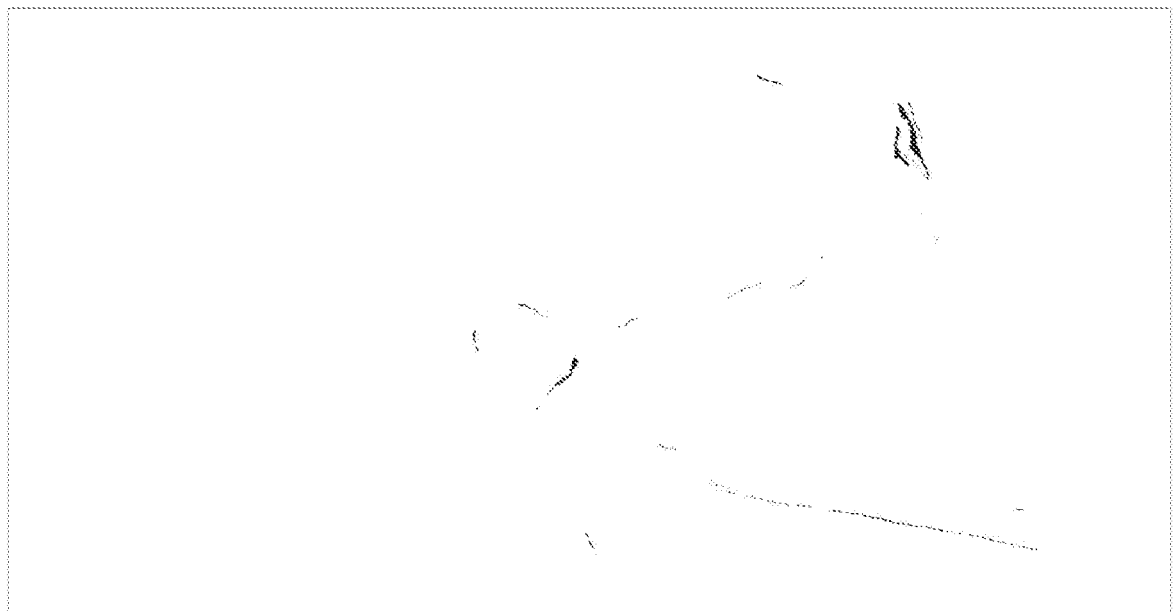
FIG. 7 is a 2D fracture image extracted according to a specific embodiment of the present disclosure.

Specifically, referring to FIG. 7, 36 fractures are identified. In this figure, fractures are marked black, and the smallest fracture includes 21 pixels while the largest fracture includes 9,481 pixels.

Figure 8:
FIG. 8 is a 2D pore-fracture image extracted according to a specific embodiment of the present disclosure.

Specifically, referring to FIG. 8, which is a comprehensive image of pores and fractures, pores are marked black, and fractures are marked gray, thereby achieving accurate identification of pores and fractures.

Further, the pore and fracture parameters are acquired by mathematical analysis of the pore and fracture data in all void spaces. These parameters specifically include pore parameters such as pore area, equivalent radius and distribution, and fracture parameters such as fracture area, equivalent radius and distribution. In this way, the accurate distribution data and characteristic data of the internal voids of the rock in the target region and the accurate seepage capability of the rock in the target reservoir are acquired. Therefore, the present disclosure can provide effective reference and guidance for exploration and development.

A second aspect of the present disclosure discloses a system for identifying a pore and a fracture based on a 2D scan image of a core, based on the method for identifying a pore and a fracture based on a 2D scan image of a core. The system includes an initial image acquisition module, a filtering module, an image segmentation module and a pore-fracture identification module, where The initial image acquisition module is configured to scan a core to acquire an initial 2D image of the core. The filtering module is configured to filter the initial 2D image of the core to acquire a first 2D image of the core. The image segmentation module is configured to segment the first 2D image of the core to acquire a second 2D image of the core. The pore-fracture identification module is configured to extract, based on the second 2D image of the core, center coordinates of all pixel points in each void space to acquire a centroid of the void space, and establish a pore-fracture identification function of the void space; identify the void space as a fracture if a value of the pore-fracture identification function is greater than a preset characterization value; and identify the void space as a pore if the value of the pore-fracture identification function is not greater than the preset characterization value.

In some preferred embodiments, the system further includes a master control center. The initial image acquisition module, the filtering module, the image segmentation module and the pore-fracture identification module are signally connected to the master control center. The pore-fracture identification module is controlled by the master control center to traverse all void spaces, acquire pore and fracture distribution data of the second 2D image, and store the acquired pore and fracture distribution data in the master control center. The master control center formulates construction and mining strategies based on the acquired pore and fracture distribution data.

A third aspect of the present disclosure provides an electronic device, including: at least one processor and a memory communicatively connected to the at least one processor, where the memory stores an instruction executable by the processor, and the instruction is executed by the processor to implement the above method for identifying a pore and a fracture based on a 2D scan image of a core.

A fourth aspect of the present disclosure proposes a computer-readable storage medium, storing a computer instruction, where the computer instruction is executed by a computer to implement the above method for identifying a pore and a fracture based on a 2D scan image of a core.

Those skilled in the art should clearly understand that, for convenience and brevity of description, reference is made to corresponding processes in the above method embodiments for specific working processes and related description of the storage device and processing device, and details are not described herein again.

Figure 9:
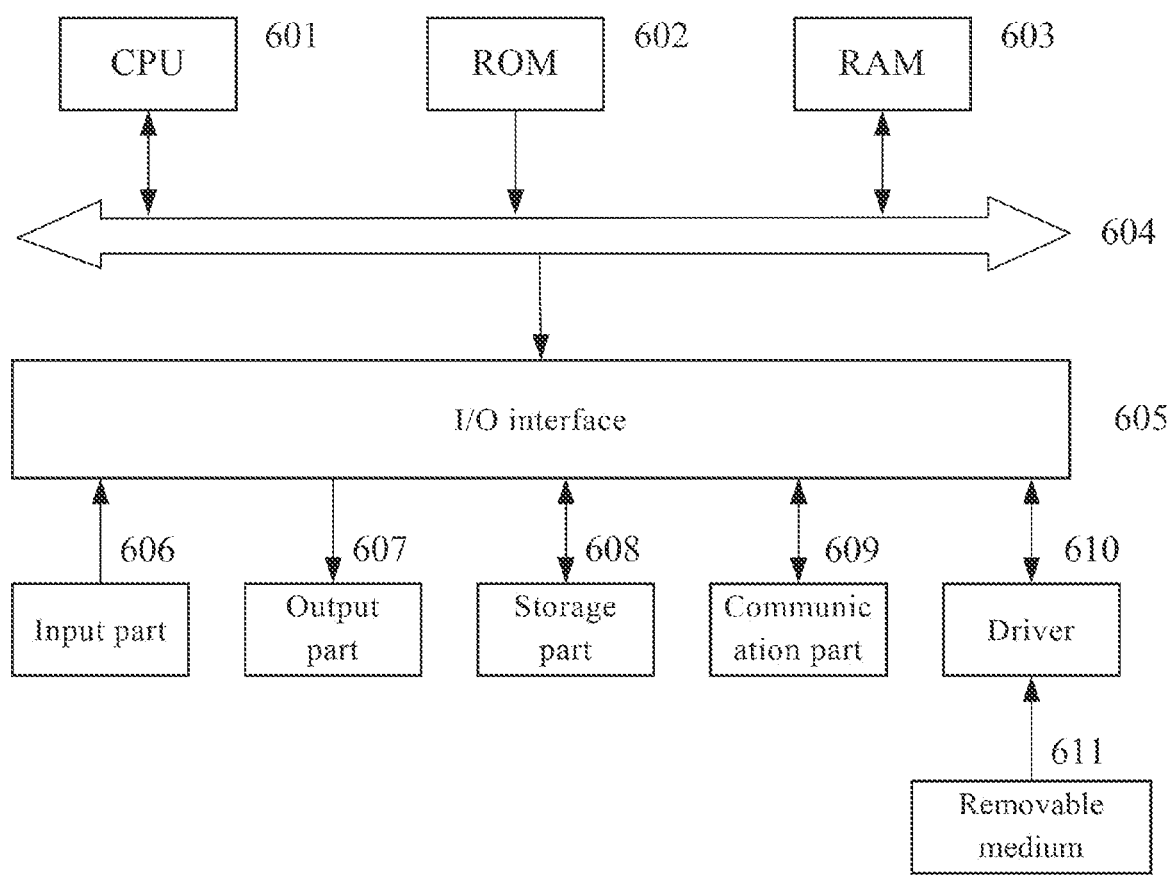
FIG. 9 is a schematic view of a computer system of a server for implementing the method, system and device embodiments of the present disclosure.

FIG. 9 shows a computer system of a server for implementing the method, system and device embodiments of the present disclosure. The server shown in FIG. 9 is merely an example, and should not be conceived as any limitation to the functions and application range of the embodiments of the present disclosure.

As shown in FIG. 9, the computer system includes a central processing unit (CPU) 601, which can perform various suitable actions and processing according to a program in a read-only memory (ROM) 602 or a program loaded from a storage part 608 to a random access memory (RAM) 603. The RAM 603 further stores various programs and data required for operations of the system. The CPU, the ROM and the RAM are connected to each other through a bus 604. An input/output (I/O) interface 605 is connected to the bus 604.

The following components are connected to the I/O interface 605: an input part 606 including a keyboard and a mouse; an output part 607 including a cathode-ray tube (CRT), a liquid crystal display (LCD) and a loudspeaker; the storage part 608 including a hard disk; and a communication part 609 including a network interface card such as a local area network (LAN) card or a modem. The communication part 609 executes communication processing via a network such as the Internet. A driver 610 is also connected to the I/O interface as needed. A removable medium 611, such as a magnetic disk, an optical disc, a magneto-optical disc, a semiconductor memory, or the like, is installed on the driver 610 as required, so that a computer program read therefrom can be installed in the storage part 608 as required.

Particularly, according to the embodiments of the present disclosure, the process described above with reference to the flowchart may be implemented as a computer software program. For example, an embodiment of the present disclosure includes a computer program product including a computer program carried by a computer-readable medium. The computer program includes program code for executing the method shown in the flowchart, In this embodiment, the computer program may be downloaded from a network by means of the communication part 609, and/or be downloaded from a removable medium 611. When the computer program is executed by the CPU, the functions defined in the method of the present disclosure are executed. It should be noted that, the computer-readable medium in the present disclosure may be a computer-readable signal medium, a computer-readable storage medium, or a combination thereof. The computer readable storage medium, may be, for example, but not limited to, electrical, magnetic, optical, electromagnetic, infrared, or semiconductor systems, apparatuses, or devices, or any combination thereof. More specific examples of the computer-readable storage medium may include, but are not limited to: an electric connector with one or more wires, a portable computer magnetic disk, a hard disk, a RAM, a ROM, an erasable programmable read-only memory (EPROM or flash memory), an optical fiber, a compact disk read-only memory (CD-ROM), an optical storage device, a magnetic storage device, or any proper combination thereof. In the present disclosure, the computer readable storage medium may be any tangible medium including or storing a program, and the program may be used by or used in combination with an instruction execution system, apparatus or device. In the present disclosure, the computer readable signal medium may include a data signal propagated in a baseband or propagated as a part of a carrier, and carries a computer readable program code. The propagated data signal may be in various forms, including but not limited to an electromagnetic signal, an optical signal, or any suitable combination thereof. The computer-readable signal medium may alternatively be any computer-readable medium except the computer-readable storage medium. The computer-readable medium may send, propagate or transmit a program used by or used in combination with an instruction execution system, apparatus or device. The program code contained on the computer readable medium may be transmitted using any suitable medium, including but not limited to: wireless, wire, optical fiber, RF, or any suitable combination thereof.

The computer program code for executing the operations in the present disclosure may be compiled by one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. When a remote computer is involved, the remote computer may be connected to the user computer via any type of network including a LAN or a wide area network (WAN), or may be connected to an external computer (for example, connected via the Internet by an Internet service provider).

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that, in some alternative implementations, the functions marked in the blocks may alternatively occur in a different order from that marked in the drawings. For example, two successively shown blocks actually may be executed in parallel substantially, or may be executed in reverse order sometimes, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Although the present disclosure has been described with reference to the preferred embodiments, various improvements can be made and components therein can be replaced with equivalents without departing from the scope of the present disclosure. In particular, as long as there is no structural conflict, the technical features in the embodiments can be combined in any way. The present disclosure is not limited to the specific embodiments disclosed herein, but should include all technical solutions falling within the scope of the claims.

In the description of the present disclosure, terms such as "central", "upper", "lower", "left", "right", "vertical", "horizontal", "inner", and "outer" indicate orientation or position relationships based on the drawings. They are merely intended to facilitate description, rather than to indicate or imply that the mentioned apparatus or components must have the specific orientation and must be constructed and operated in the specific orientation. Therefore, these terms should not be construed as a limitation to the present disclosure. Moreover, the terms "first", "second" and "third" are used only for the purpose of description, rather than to indicate or imply relative importance.

In addition, it should be noted that in the description of the present disclosure, unless otherwise clearly specified, meanings of terms "install", "connect with" and "connect to" should be understood in a broad sense. For example, the connection may be a fixed connection, a removable connection, or an integral connection, may be a mechanical connection or an electrical connection, may be a direct connection or an indirect connection via a medium, and may be an internal connection between two components. Those skilled in the art should understand the specific meanings of the above terms in the present disclosure based on specific situations.

In addition, terms "include", "comprise", or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

The technical solutions of the present disclosure are described with reference to the preferred implementations and drawings. Those skilled in the art should easily understand that the protection scope of the present disclosure is apparently not limited to these specific implementations, Those skilled in the art can make equivalent changes or substitutions to the relevant technical features without departing from the principles of the present disclosure, and the technical solutions derived by making these changes or substitutions should fall within the protection scope of the present disclosure.

What is claimed is:

1. A method for identifying a pore and a fracture based on a two-dimensional (2D) scan image of a core, wherein the method comprises the following steps:

S100: scanning a core to acquire an initial 2D image of the core;

S200: filtering the initial 2D image of the core to acquire a first 2D image of the core;

S300: segmenting the first 2D image of the core to acquire a second 2D image of the core;

S400: extracting, based on the second 2D image of the core, center coordinates of all pixel points in each void space to acquire a centroid of the void space, and establishing a pore-fracture identification function of the void space;

identifying the void space as a fracture if a value of the pore-fracture identification function is greater than a preset characterization value; and identifying the void space as a pore if the value of the pore-fracture identification function is not greater than the preset characterization value; and S500: traversing, by repeating step S400, all void spaces to acquire pore and fracture distribution data of the second 2D image of the core;

wherein, a pore-fracture identification function of an n-th void space is $A_n$; and the preset characterization value $\alpha$ refers to a value of a pore-fracture identification function of a rectangle with a set aspect ratio and a circle with a same area as the rectangle;

$$A_n = \frac{f_n}{f_{nc}},$$

$$f_n = \sum_1^i R_{ni}^a,$$

$$R_{ni} = \sqrt{(X_{ni} - X_{nc})^2 + (Y_{ni} - Y_{nc})^2},$$

$$X_{nc} = \frac{\sum_1^i X_{ni}}{i},$$

$$Y_{nc} = \frac{\sum_1^i Y_{ni}}{i},$$

wherein, $f_{nc}$ denotes a pore-fracture characteristic value of a circle with a same area as the n-th void space; and $X_{ni}$ denotes an abscissa of an i-th pixel point in the n-th void space, and $Y_{ni}$ denotes an ordinate of the i-th pixel point in the n-th void space.

2. The method according to claim 1, wherein step S300 specifically comprises:
   S310: extracting a void space of the core by image threshold segmentation, and acquiring a void space image of the core; and
   S320: removing, based on a preset single-pixel threshold, an abnormal point from the void space image of the core to acquire the second 2D image of the core.

3. The method according to claim 1, wherein the initial 2D image of the core is acquired by a core scanning device.

4. The method according to claim 3, wherein the core scanning device is a micron-level field emission scanning electron microscope (FE-SEM).

5. The method according to claim 1, wherein in step S200, the filtering is one selected from the group of mean filtering, non-local means (NLM) filtering, median filtering, Wiener filtering and Gaussian filtering.

6. The method according to claim 5, wherein in step S200, the filtering specifically comprises: filtering a grayscale image with noise.

7. A system for identifying a pore and a fracture based on a 2D scan image of a core, based on the method according to claim 1, comprising an initial image acquisition module, a filtering module, an image segmentation module and a pore-fracture identification module, wherein
   the initial image acquisition module is configured to scan the core to acquire the initial 2D image of the core;
   the filtering module is configured to filter the initial 2D image of the core to acquire the first 2D image of the core;
   the image segmentation module is configured to segment the first 2D image of the core to acquire the second 2D image of the core; and
   the pore-fracture identification module is configured to extract, based on the second 2D image of the core, center coordinates of all pixel points in each void space to acquire the centroid of the void space, and establish the pore-fracture identification function of the void space; identify the void space as a fracture if a value of the pore-fracture identification function is greater than the preset characterization value; and identify the void space as a pore if the value of the pore-fracture identification function is not greater than the preset characterization value.

8. The system according to claim 7, wherein the system further comprises a master control center; the initial image acquisition module, the filtering module, the image segmentation module and the pore-fracture identification module communicate with the master control center through signals; the pore-fracture identification module is controlled by the master control center and configured to traverse all void spaces, acquire pore and fracture distribution data of the second 2D image, and store the acquired pore and fracture distribution data in the master control center; and the master control center formulates construction and mining strategies based on the acquired pore and fracture distribution data.

9. The system according to claim 7, wherein step S300 of the method specifically comprises:
   S310: extracting a void space of the core by image threshold segmentation, and acquiring a void space image of the core; and
   S320: removing, based on a preset single-pixel threshold, an abnormal point from the void space image of the core to acquire the second 2D image of the core.

10. The system according to claim 7, wherein in the method, the initial 2D image of the core is acquired by a core scanning device.

11. The system according to claim 10, wherein in the method, the core scanning device is a micron-level field emission scanning electron microscope (FE-SEM).

12. The system according to claim 7, wherein in step S200 of the method,, the filtering is one selected from the group of mean filtering, non-local means (NLM) filtering, median filtering, Wiener filtering and Gaussian filtering.

13. The system according to claim 12, wherein in step S200 of the method, the filtering specifically comprises: filtering a grayscale image with noise.

14. An electronic device, comprising:
   at least one processor; and
   a memory communicatively connected to the at least one processor, wherein
   the memory stores an instruction executable by the processor; and the instruction is executed by the processor to implement the method according to claim 1.

15. The electronic device according to claim 14, wherein step S300 of the method specifically comprises:
   S310: extracting a void space of the core by image threshold segmentation, and acquiring a void space image of the core; and
   S320: removing, based on a preset single-pixel threshold, an abnormal point from the void space image of the core to acquire the second 2D image of the core.

16. The electronic device according to claim 14, wherein in the method, the initial 2D image of the core is acquired by a core scanning device.

17. The electronic device according to claim 16, wherein in the method, the core scanning device is a micron-level field emission scanning electron microscope (FE-SEM).

18. The electronic device according to claim 14, wherein in step S200 of the method,, the filtering is one selected from the group of mean filtering, non-local means (NLM) filtering, median filtering, Wiener filtering and Gaussian filtering.

19. The electronic device according to claim 18, wherein in step S200 of the method, the filtering specifically comprises: filtering a grayscale image with noise.

* * * * *